United States Patent [19]

Frankel

[11] Patent Number: 5,503,297
[45] Date of Patent: Apr. 2, 1996

[54] MOUNTABLE ARTICLE STORAGE SYSTEM

[75] Inventor: Gail B. Frankel, Dallas, Tex.

[73] Assignee: Kel-Gar, Inc., Dallas, Tex.

[21] Appl. No.: 135,832

[22] Filed: Oct. 12, 1993

Related U.S. Application Data

[60] Continuation-in-part of Ser. No. 121,274, Sep. 13, 1993, Pat. No. 5,400,990, which is a division of Ser. No. 937,589, Aug. 31, 1992, Pat. No. 5,244,175, which is a continuation of Ser. No. 709,716, Jun. 3, 1991, Pat. No. 5,143,335, which is a continuation of Ser. No. 460,860, Jan. 31, 1990, Pat. No. 5,020,755.

[51] Int. Cl.⁶ ............................................. B65D 25/10
[52] U.S. Cl. ..................... 220/751; 220/737; 248/311.2
[58] Field of Search .................................. 220/751, 737, 220/521, 416; 206/564; 248/231.4, 311.2

[56] References Cited

U.S. PATENT DOCUMENTS

| | | |
|---|---|---|
| D. 153,348 | 4/1949 | Gainsbro . |
| D. 228,304 | 9/1973 | Lerew et al. . |
| 1,134,577 | 4/1915 | Apple . |
| 1,411,572 | 4/1922 | Kramer .................................. 248/231.4 |
| 1,577,298 | 3/1926 | Roeller . |
| 2,265,336 | 12/1941 | Banck ...................................... 220/521 |
| 2,745,465 | 5/1956 | Hogan . |
| 2,750,951 | 6/1956 | Barnwell . |
| 3,008,679 | 11/1961 | Powell ................................... 248/231.4 |
| 3,526,314 | 9/1970 | Trammell . |
| 3,698,675 | 10/1972 | Lerew et al. . |
| 3,904,041 | 9/1975 | Medgebow . |
| 3,966,083 | 6/1976 | Hoffman et al. ......................... 220/751 |
| 3,978,612 | 9/1976 | Young .................................... 248/311.2 |
| 4,074,683 | 2/1978 | DiChiara . |
| 4,274,567 | 6/1981 | Sawyer . |
| 4,289,156 | 9/1981 | Ulics . |
| 4,491,257 | 1/1985 | Ingles . |
| 4,575,149 | 3/1986 | Forestal et al. ........................ 248/231.4 |
| 4,681,219 | 7/1987 | Kitchens ................................. 206/564 |
| 4,727,890 | 3/1988 | Vincent ................................. 248/311.2 |
| 4,844,400 | 7/1989 | Jasmagy, Jr. . |
| 4,856,744 | 8/1989 | Frankel . |
| 4,934,640 | 6/1990 | Bichon .................................. 248/311.2 |
| 4,974,803 | 12/1990 | Richer et al. .......................... 248/311.2 |
| 4,984,722 | 1/1991 | Moore ................................... 248/311.2 |
| 5,018,633 | 5/1991 | Toth et al. ............................. 248/311.2 |
| 5,020,755 | 6/1991 | Frankel . |
| 5,094,355 | 3/1992 | Clark ...................................... 206/564 |
| 5,108,059 | 4/1992 | Curtis ................................... 248/311.2 |
| 5,143,335 | 9/1992 | Frankel . |
| 5,244,175 | 9/1993 | Frankel . |
| 5,280,870 | 1/1994 | Chick et al. .......................... 248/311.2 |
| 5,316,368 | 5/1994 | Arbisi .................................. 248/311.2 |
| 5,344,225 | 9/1994 | Blyth ..................................... 206/564 |

Primary Examiner—David Scherbel
Assistant Examiner—Tony G. Soohoo
Attorney, Agent, or Firm—Konneker & Bush

[57] ABSTRACT

An article storage system for supporting at least one article thereon and mountable to a support frame. The article storage system includes a tray structure having first and second portions, a clamping structure which mounts the tray structure to the support frame and attachment structure for attaching the tray structure to the clamping structure. The first portion of the tray structure includes a first sidewall which defines a first, open-topped, receptacle and the second portion of the tray structure includes a second sidewall which defines a second receptacle and a lid structure rotatably affixed to the second sidewall. The lid structure includes a planar main body portion having upper and lower side surfaces, a first sidewall extending upwardly from the upper side surface for defining a first enclosed area for receiving loose articles therein when the lid structure is in a closed position and a second sidewall extending downwardly from the lower side surface for defining a second enclosed area for receiving loose articles therein when the lid structure is in an open position.

53 Claims, 5 Drawing Sheets

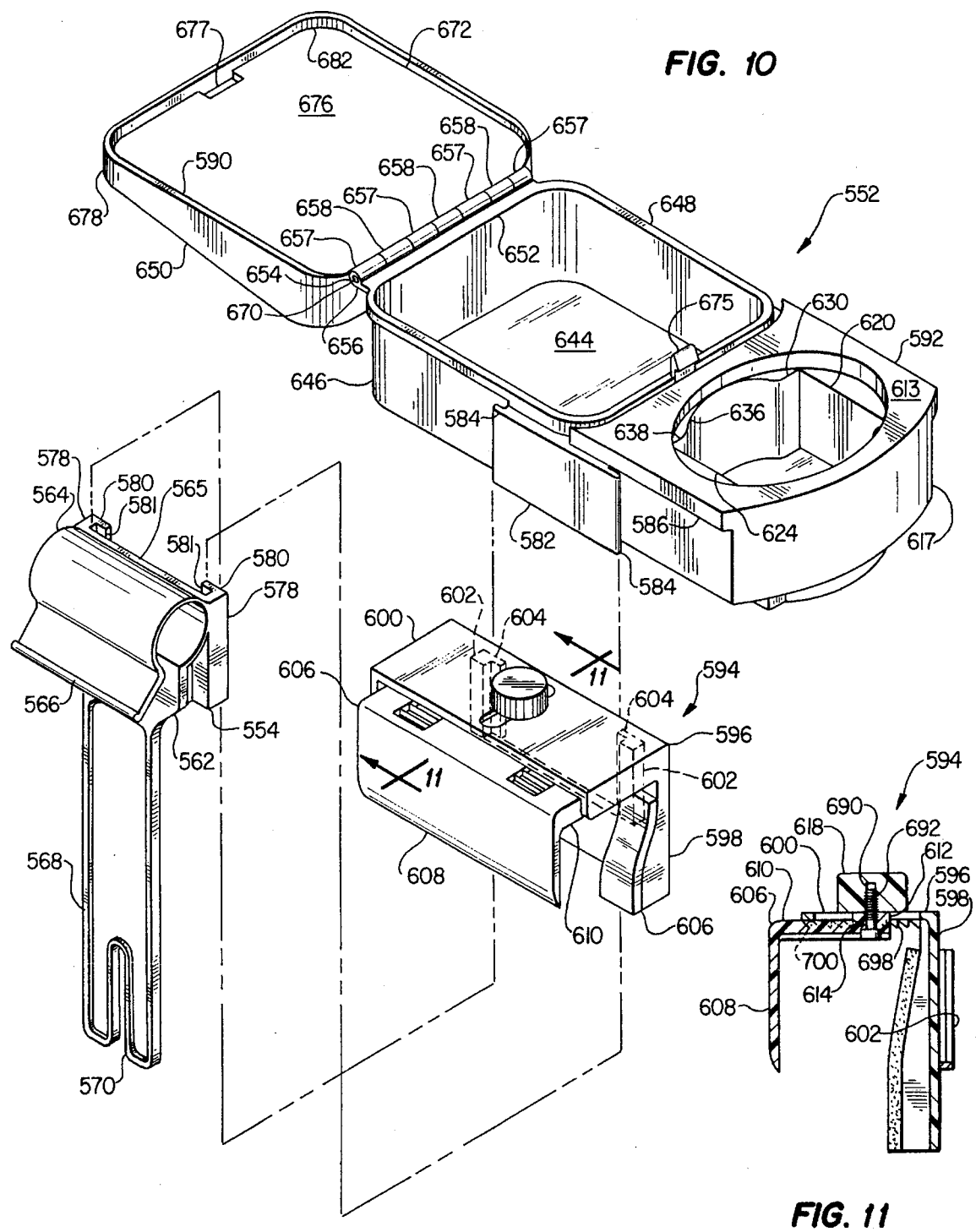

MOUNTABLE ARTICLE STORAGE SYSTEM

CROSS-REFERENCE TO RELATED APPLICATIONS

This application is a Continuation-in-part of U.S. patent application Ser. No. 08/121,274, now U.S. Pat. No. 5,400,990 filed Sep. 13, 1993, entitled "Handle Support Assembly", which is a Division of U.S. patent application Ser. No. 07/937,589, filed Aug. 31, 1992, now U.S. Pat. No. 5,244,175, which is a Continuation of U.S. patent application Ser. No. 07/709,716, filed Jun. 3, 1991, now U.S. Pat. No. 5,143,335, which is a Continuation of U.S. patent application Ser. No. 07/460,860, filed Jan. 31, 1990, now U.S. Pat. No. 5,020,755. U.S. Pat. No. 5,020,755 is the U.S. national application filed based upon PCT Application No. US89/2402 which claimed priority based upon Ser. No. 07/201,480, now U.S. Pat. No. 4,856,744.

BACKGROUND OF THE INVENTION

1. Field of the Invention

The present invention is related to mountable article storage systems and, more particularly, to a article storage system adapted for demountable attachment to strollers, including both soft-sided and hard-sided strollers, car doors and other support structures.

2. Description of Related Art

Numerous portable article carrying units have been disclosed in the art. These units have been designed and constructed for support of a myriad of items and for a plurality of applications. The items include beverages, books, newspapers and small personal items. Their applications include securement to bicycle handlebars, grocery baskets, crutches and similar devices adapted for facilitating ambulatory motion with the conveyance of associated articles. It is not uncommon for such assemblies to have designs adapted specifically for the primary article support application. For example, shopping basket support assemblies have included configured plate assemblies adapted for interengaging the orthogonal frame basket members in a fashion facilitating stability of the configured plate. Such a plate has been constructed for supporting beverage containers, as shown in U.S. Pat. No. 2,633,278. It may seen in this 1953 patent that the overall configuration affording such stability and ease in assembly is unique to the particular application disclosed therein.

Numerous other attachment devices have been the subject of innovation in the art. For example, U.S. Pat. No. 1,134,577 illustrates a bicycle handlebar connection assembly affording support for a basket. Although this is a somewhat antiquated, i.e., circa 1915, design, it illustrates the importance of freedom of the user's hands relative to handlebars and the like. More recent developments include handle assemblies for more conventional ambulatory assistance structures. Wheelchairs, for example, are designed to assist the physically impaired and, therefore, convenience assemblies mounted to the wheelchair facilitate both the wheelchair operator and/or those persons assisting the wheelchair operator. Such assemblies include beverage container support and clipboard mounting structures which allow the wheelchair occupant and/or operator immediate access to the articles supported thereby. Indeed, it is the ability to afford the occupant and/or operator of a particular vehicle for which the support structure is associated, ease and access that comprises the most important utilitarian function of the structure. The method and apparatus of attachment have thus been the subject of individual design and engineering considerations. Many of these designs and considerations have been deemed novel throughout the previous decades for a plurality of vehicle and/or frame structures generally associated with ambulatory motion.

Structures associated with ambulatory motion include not only wheelchairs but also bicycles, crutches, shopping carts, and infant strollers. These articles generally require attention by the operator of the ambulatory motion structure. For all of these structures, the hands of the operator are generally fully occupied in controlling the structure. Even so, access to objects such as drinking containers or related supported articles is necessary for the convenience and comfort of the operator. Relative to handlebars for bicycles, strollers, shopping carts and the like, it is often necessary for the user to manually steer the particular wheeled structure as well. It is clearly an encumbrance for the operator to also deal with loose articles such as purses, sweaters, drinks, or infant care articles while handling a bicycle, stroller or shopping cart.

Many innovations in the art have thus addressed these various utilitarian needs by the provision of mechanical assemblies adapted for mounting to handlebar areas for particular structures and applications. U.S. Pat. No. 4,071,175 teaches a beverage container holder for a handlebar which permits its attachment in a convenient location and orientation. The same holds true for U.S. Pat. Nos. 4,312,465 and 4,570,835, both of which teach related beverage container holder supports facilitating user operation. These references manifest the advantages and need for such innovation.

A distinct area of need in handlebar support structures adapted for facilitating the convenience of the user is not only a beverage container support but means for easily supporting the loose articles described above. In the case of shopping carts and baby strollers, it is common for the operator to carry loose sweaters, purses, shopping bags and/or infant care bags. Without proper securement of these articles relative to the shopping cart or stroller, both inconvenience and danger can result due to lack of attention by the operator in the event that the articles become loose, dislodged and/or are generally unsecured. It would be a distinct advance over the art to provide a support assembly specifically adapted for handlebar regions for strollers, carts and the like, thereby facilitating the support of the aforesaid articles in a safe, convenient and economical fashion.

Accordingly, in the parent and grandparent of the present application (U.S. patent application Ser. No. 08/121,274 and U.S. Pat. No. 5,244,275, respectively), a support assembly system for use with a generally horizontal bar, shaft, or handle was disclosed and claimed. The support assembly system included a body portion, an end portion extending upwardly from the body portion such that the end portion circumferentially and frictionally grips the generally cylindrical horizontal bar, shaft or handle, and means for removably mounting a generally cylindrical receptacle to the body portion such that the generally cylindrical receptacle extends downwardly from the body portion of the support assembly system. In U.S. Pat. No. 5,020,755, the great-grandparent of the present application, a similar structure which included first and second hook portions adapted for supporting articles such as packages, clothes and purses was further disclosed and claimed.

While such article support assembly systems provided significant benefits, several limitations in such systems have since been recognized. While the superior ability of the prior systems to supportably mount a beverage container such as a canned drink has long been recognized, it is acknowledged that, under many circumstances, it would be much more desirable if the system were able to support additional foodstuffs, e.g. sandwiches or other loose snacks. Second, the prior article support assembly system was primarily designed for use by the operator of the stroller and was not, therefore, readily accessible to the infant or child being carried thereby. Finally, the structure used to mount the article support assembly system to the horizontal bar of a stroller cart or the like proved suitable only for mounting the system to those devices provided with a generally cylindrical horizontal bar having a diameter within a specified range. Accordingly, the article support assembly system has proven unsuitable for mounting onto various portions of the structural framework of numerous ambulation devices, for example, a passenger door of an automobile, and even certain stroller designs, particularly those characterized by unusually large side or handle bars.

It can be readily seen from the foregoing that it would be desirable to provide an improved article support assembly system capable of supporting a wider array of foodstuffs, be suitable for mounting onto a broader array of ambulation devices and, when mounted onto such devices, be accessible to both the operator and occupant thereof. It is accordingly an object of the present invention to provide such an improved article support assembly system.

SUMMARY OF THE INVENTION

In one embodiment, the present invention is of an article storage system for supporting at least one article thereon and mountable to a support frame. The article storage system includes a tray structure having first and second portions, a clamping structure which mounts the tray structure to the support frame and attachment means for attaching the tray structure to the clamping structure. The first portion of the tray structure includes a first sidewall which defines a first, open-topped, receptacle for supportably receiving an article therein. The second portion of the tray structure, on the other hand, includes a second sidewall which defines a second receptacle for supportably receiving a second article therein and a lid structure rotatably affixed to the second sidewall. The lid structure is movable between a closed position in which access to the second receptacle is blocked by the lid structure and an open position in which the second receptacle is accessible.

In one aspect thereof, the lid structure is configured to include a generally planar main body portion having upper and lower side surfaces and a first sidewall extending upwardly from the upper side surface for defining a first enclosed area for receiving loose articles therein when the lid structure is in the closed position. In another aspect, the lid structure further includes a second sidewall extending downwardly from the lower side surface for defining a second enclosed area for receiving loose articles therein when the lid structure is in the open position. In yet another aspect, the first sidewall is shaped such that the first, open-topped, receptacle is configured to receivably support both cylindrically-shaped and box-shaped beverage containers. In a further aspect thereof, a flange member is formed on an exterior side surface of the tray structure to removably engage the clamping structure to the tray structure, preferably by receivably mating first and second projections formed on the flange member with a guide formed on the clamping structure. A second flange member may also be formed along a second exterior side surface of the tray structure.

In a further aspect thereof, the clamping structure further includes a body portion, a first end portion which extends downwardly from the body portion, and a second end portion which extends upwardly from the body portion. The first end portion engages a first generally horizontal bar of the support frame while the second end portion engages a second generally horizontal bar of the support frame. The second end portion is configured to include a first end integrally formed with the body portion, a generally tubular intermediate section for circumferentially and frictionally gripping the second bar, and a second end. In one aspect, the second end portion further includes means for inserting the second generally horizontal bar into the generally tubular intermediate section for circumferential gripping therewith, preferably, a lip integrally formed with the generally tubular intermediate section at the second end.

In a still further aspect thereof, a slotted aperture is formed in the first end portion. The first bar may then be inserted into the slotted aperture to engage the clamping structure and the first bar. Preferably, the first end portion includes a bottom edge surface from which the slotted aperture extends upwardly therefrom in a direction generally parallel with the downward extension of the first end portion. In one aspect, the clamping structure may further include a flexible tube having first and second ends and a slit which extends therebetween. The tube, which has a diameter wider than the slotted aperture, is mounted onto the first bar to limit movement of the clamping structure relative to the first generally horizontal bar. Preferably, the tube is mounted onto the first bar along a first side surface of the first end portion which faces the support frame. Tie means may then be used to secure the tube to the first bar such that the second end of the tube engages the first side surface of the first end portion.

In an alternate aspect thereof, the clamping structure may be comprised of first and second generally L-shaped body portions. The first generally L-shaped body portion includes a top part having a slot formed therein and a side part generally orthogonal to and integrally formed with the top part while the second generally L-shaped body portion includes a top part and a side part generally orthogonal to and integrally formed with the top part. Also included is means for adjustably securing the top part of the first generally L-shaped body portion to the top part of the second generally L-shaped body portion such that the distance between the side part of the first and second generally L-shaped body portions may be varied when the top parts are secured together. The support frame is receivably engaged between the first and second side parts to supportably mount the article storage system to the support frame.

In one aspect, the means for adjustably securing the top part of the first generally L-shaped body portion and the top part of the second generally L-shaped body portion may include a projection extending upwardly from the top part of the second generally L-shaped body portion and through the slot formed in the top part of the first generally L-shaped body portion and knob means for engaging the portion of the projection projecting from the slot. In another aspect, the projection may be a generally circular projection integrally formed with the second top part. The projection has a diameter slightly less than the width of the slot and an aperture formed in the general center thereof. Screw means may then extend through the aperture in the projection and project from the top side of the first generally L-shaped body portion where it is threadably received in a threaded aperture formed in the general center of the knob means. In another aspect, a lower side surface of the top part of the first generally L-shaped body portion may include a generally parallel series of projections and an upper side surface of the top part of the second generally L-shaped body portion may include a corresponding generally parallel series of indentations. The projections of the first top part are received by the corresponding indentations of the second top part to provide frictional engagement between the first and second generally L-shaped body portions.

In another embodiment, the present invention is of an article storage system for supporting at least one article thereon and mountable to a support frame. The article storage system includes a tray structure having a sidewall which defines a first, open-topped, receptacle for supportably receiving an article therein, a clamping structure which mounts the tray structure to the support frame and attachment means for attaching the tray structure to the clamping structure. In one aspect, the first sidewall is shaped such that the first, open-topped, receptacle is configured to receivably support both cylindrically-shaped and box-shaped beverage containers. In another aspect, the sidewall of the tray structure includes a curved part dimensioned to supportably engage a portion of an exterior surface of a cylindrically shaped beverage container and a non-curved part integrally formed with the curved part and dimensioned to supportably engage a portion of an exterior surface of a box-shaped beverage container. In yet another aspect, the sidewall includes first and second planar sidewall portions integrally formed with and generally orthogonal to each other, a third, curved sidewall portion integrally formed with the second sidewall portion, a fourth, planar, sidewall portion integrally formed with the third sidewall portion and co-planar with the second sidewall portion, a fifth, planar sidewall portion integrally formed with and generally orthogonal to the fourth sidewall portion such that the first and fifth sidewall portions are parallel to each other, a sixth, planar, sidewall portion integrally formed with and generally orthogonal to the fifth sidewall portion such that the fourth and sixth sidewall portions are parallel to each other, a seventh, curved sidewall portion integrally formed with the sixth sidewall portion and oppositely orientated relative to the third sidewall portion and an eighth, planar sidewall portion integrally formed with the first and seventh sidewall portions, coplanar with the sixth sidewall portion, orthogonal to the first sidewall portion and parallel to the second sidewall portion.

In a further aspect thereof, the first sidewall of the tray structure may include an outwardly projecting portion having a lower edge surface which provides a stop when attaching the tray structure to the clamping structure and, in another aspect, a flange member is formed on an exterior side surface of the tray structure to removably engage the clamping structure to the tray structure, preferably by receivably mating first and second projections formed on the flange member with a guide formed on the clamping structure. A second flange member may also be formed along a second exterior side surface of the tray structure.

In a further aspect thereof, the clamping structure further includes a body portion, a first end portion which extends downwardly from the body portion, and a second end portion which extends upwardly from the body portion. The first end portion engages a first generally horizontal bar of the support frame while the second end portion engages a second generally horizontal bar of the support frame. The second end portion is configured to include a first end integrally formed with the body portion, a generally tubular intermediate section for circumferentially and frictionally gripping the second bar, and a second end. In one aspect, the second end portion further includes means for inserting the second generally horizontal bar into the generally tubular intermediate section for circumferential gripping therewith, preferably, a lip integrally formed with the generally tubular intermediate section at the second end.

In a still further aspect thereof, a slotted aperture is formed in the first end portion. The first bar may then be inserted into the slotted aperture to engage the clamping structure and the first bar. Preferably, the first end portion includes a bottom edge surface from which the slotted aperture extends upwardly therefrom in a direction generally parallel with the downward extension of the first end portion. In one aspect, the clamping structure may further include a flexible tube having first and second ends and a slit which extends therebetween. The tube, which has a diameter wider than the slotted aperture, is mounted onto the first bar to limit movement of the clamping structure relative to the first generally horizontal bar. Preferably, the tube is mounted onto the first bar along a first side surface of the first end portion which faces the support frame. Tie means may then be used to secure the tube to the first bar such that the second end of the tube engages the first side surface of the first end portion.

In an alternate aspect thereof, the clamping structure may be comprised of first and second generally L-shaped body portions. The first generally L-shaped body portion includes a top part having a slot formed therein and a side part generally orthogonal to and integrally formed with the top part while the second generally L-shaped body portion includes a top part and a side part generally orthogonal to and integrally formed with the top part. Also included is means for adjustably securing the top part of the first generally L-shaped body portion to the top part of the second generally L-shaped body portion such that the distance between the side part of the first and second generally L-shaped body portions may be varied when the top parts are secured together. The support frame is receivably engaged between the first and second side parts to supportably mount the article storage system to the support frame.

In one aspect, the means for adjustably securing the top part of the first generally L-shaped body portion and the top part of the second generally L-shaped body portion may include a projection extending upwardly from the top part of the second generally L-shaped body portion and through the slot formed in the top part of the first generally L-shaped body portion and knob means for engaging the portion of the projection projecting from the slot. In another aspect, the projection may be a generally circular projection integrally formed with the second top part. The projection has a diameter slightly less than the width of the slot and an aperture formed in the general center thereof. Screw means may then extend through the aperture in the projection and project from the top side of the first generally L-shaped body portion where it is threadably received in a threaded aperture formed in the general center of the knob means. In another aspect, a lower side surface of the top part of the first generally L-shaped body portion may include a generally parallel series of projections and an upper side surface of the top part of the second generally L-shaped body portion may include a corresponding generally parallel series of indentations. The projections of the first top part are received by the corresponding indentations of the second top part to provide frictional engagement between the first and second generally L-shaped body portions.

In yet another embodiment, the present invention is of an article storage system for supporting at least one article thereon and mountable to a support frame. The article storage system includes a tray structure having a sidewall which defines a receptacle for supportably receiving a second article therein, a clamping structure which mounts the tray structure to the support frame and attachment means for attaching the tray structure to the clamping structure. A lid structure is rotatably affixed to the sidewall such that it is movable between a closed position in which access to the second receptacle is blocked by the lid structure and an open position in which the second receptacle is accessible.

In one aspect thereof, the lid structure is configured to include a generally planar main body portion having upper and lower side surfaces and a first sidewall extending upwardly from the upper side surface for defining a first enclosed area for receiving loose articles therein when the lid structure is in the closed position. In another aspect, the lid structure further includes a second sidewall extending downwardly from the lower side surface for defining a second enclosed area for receiving loose articles therein when the lid structure is in the open position. The sidewall may also include a flexible projection integrally formed therewith and upwardly projecting therefrom and the lid structure include an aperture formed therein such that, when the projection is receivably inserted in the aperture, the lid structure is locked in the closed position. In a further aspect, a flange member is formed on an exterior side surface of the tray structure to removably engage the clamping structure to the tray structure, preferably by receivably mating first and second projections formed on the flange member with a guide formed on the clamping structure. A second flange member may also be formed along a second exterior side surface of the tray structure.

In a further aspect thereof, the clamping structure further includes a body portion, a first end portion which extends downwardly from the body portion, and a second end portion which extends upwardly from the body portion. The first end portion engages a first generally horizontal bar of the support frame while the second end portion engages a second generally horizontal bar of the support frame. The second end portion is configured to include a first end integrally formed with the body portion, a generally tubular intermediate section for circumferentially and frictionally gripping the second bar, and a second end. In one aspect, the second end portion further includes means for inserting the second generally horizontal bar into the generally tubular intermediate section for circumferential gripping therewith, preferably, a lip integrally formed with the generally tubular intermediate section at the second end.

In a still further aspect thereof, a slotted aperture is formed in the first end portion. The first bar may then be inserted into the slotted aperture to engage the clamping structure and the first bar. Preferably, the first end portion includes a bottom edge surface from which the slotted aperture extends upwardly therefrom in a direction generally parallel with the downward extension of the first end portion. In one aspect, the clamping structure may further include a flexible tube having first and second ends and a slit which extends therebetween. The tube, which has a diameter wider than the slotted aperture, is mounted onto the first bar to limit movement of the clamping structure relative to the first generally horizontal bar. Preferably, the tube is mounted onto the first bar along a first side surface of the first end portion which faces the support frame. Tie means may then be used to secure the tube to the first bar such that the second end of the tube engages the first side surface of the first end portion.

In an alternate aspect thereof, the clamping structure may be comprised of first and second generally L-shaped body portions. The first generally L-shaped body portion includes a top part having a slot formed therein and a side part generally orthogonal to and integrally formed with the top part while the second generally L-shaped body portion includes a top part and a side part generally orthogonal to and integrally formed with the top part. Also included is means for adjustably securing the top part of the first generally L-shaped body portion to the top part of the second generally L-shaped body portion such that the distance between the side part of the first and second generally L-shaped body portions may be varied when the top parts are secured together. The support frame is receivably engaged between the first and second side parts to supportably mount the article storage system to the support frame.

In one aspect, the means for adjustably securing the top part of the first generally L-shaped body portion and the top part of the second generally L-shaped body portion may include a projection extending upwardly from the top part of the second generally L-shaped body portion and through the slot formed in the top part of the first generally L-shaped body portion and knob means for engaging the portion of the projection projecting from the slot. In another aspect, the projection may be a generally circular projection integrally formed with the second top part. The projection has a diameter slightly less than the width of the slot and an aperture formed in the general center thereof. Screw means may then extend through the aperture in the projection and project from the top side of the first generally L-shaped body portion where it is threadably received in a threaded aperture formed in the general center of the knob means. In another aspect, a lower side surface of the top part of the first generally L-shaped body portion may include a generally parallel series of projections and an upper side surface of the top part of the second generally L-shaped body portion may include a corresponding generally parallel series of indentations. The projections of the first top part are received by the corresponding indentations of the second top part to provide frictional engagement between the first and second generally L-shaped body portions.

In still yet another embodiment, the present invention is of a clamping structure for mounting a tray structure for supporting at least one article thereon to a support frame having first and second generally horizontal bars. The clamping structure includes a body portion, a first end portion which extends downwardly from the body portion, and a second end portion which extends upwardly from the body portion. The first end portion engages a first generally horizontal bar of the support frame while the second end portion engages a second generally horizontal bar of the support frame. The second end portion is configured to include a first end integrally formed with the body portion, a generally tubular intermediate section for circumferentially and frictionally gripping the second bar, and a second end. In one aspect, the second end portion further includes means for inserting the second generally horizontal bar into the generally tubular intermediate section for circumferential gripping therewith, preferably, a lip integrally formed with the generally tubular intermediate section at the second end.

In one aspect thereof, a slotted aperture is formed in the first end portion. The first bar may then be inserted into the slotted aperture to engage the clamping structure and the first bar. Preferably, the first end portion includes a bottom edge surface from which the slotted aperture extends upwardly therefrom in a direction generally parallel with the downward extension of the first end portion. In one aspect, the clamping structure may further include a flexible tube having first and second ends and a slit which extends therebetween. The tube, which has a diameter wider than the slotted aperture, is mounted onto the first bar to limit movement of the clamping structure relative to the first generally horizontal bar. Preferably, the tube is mounted onto the first bar along a first side surface of the first end portion which faces the support frame. Tie means may then be used to secure the tube to the first bar such that the second end of the tube engages the first side surface of the first end portion.

In still another embodiment, the present invention is of a clamping structure for mounting a tray structure for supporting at least one article thereon to a support frame. The clamping structure includes first and second generally L-shaped body portions. The first generally L-shaped body portion includes a top part having a slot formed therein and a side part generally orthogonal to and integrally formed with the top part while the second generally L-shaped body portion includes a top part and a side part generally orthogonal to and integrally formed with the top part. Also included is means for adjustably securing the top part of the first generally L-shaped body portion to the top part of the second generally L-shaped body portion such that the distance between the side part of the first and second generally L-shaped body portions may be varied when the top parts are secured together. The support frame is receivably engaged between the first and second side parts to supportably mount the article storage system to the support frame.

In one aspect, the means for adjustably securing the top part of the first generally L-shaped body portion and the top part of the second generally L-shaped body portion may include a projection extending upwardly from the top part of the second generally L-shaped body portion and through the slot formed in the top part of the first generally L-shaped body portion and knob means for engaging the portion of the projection projecting from the slot. In another aspect, the projection may be a generally circular projection integrally formed with the second top part. The projection has a diameter slightly less than the width of the slot and an aperture formed in the general center thereof. Screw means may then extend through the aperture in the projection and project from the top side of the first generally L-shaped body portion where it is threadably received in a threaded aperture formed in the general center of the knob means. In another aspect, a lower side surface of the top part of the first generally L-shaped body portion may include a generally parallel series of projections and an upper side surface of the top part of the second generally L-shaped body portion may include a corresponding generally parallel series of indentations. The projections of the first top part are received by the corresponding indentations of the second top part to provide frictional engagement between the first and second generally L-shaped body portions.

BRIEF DESCRIPTION OF THE DRAWING

The invention will be better understood and its numerous objects and advantages will become apparent to those skilled in the art by reference to the following drawing in which:

FIG. 10 is an exploded enlarged perspective view of the mountable article storage system of FIGS. 7–9 and illustrating first and second configurations of the clamping structure portion for alternate attachment thereto;

FIG. 11 is a cross-sectional view of the second configuration of the clamping structure portion of FIG. 10 taken across lines 11—11 thereof;

DETAILED DESCRIPTION

Figure 1:
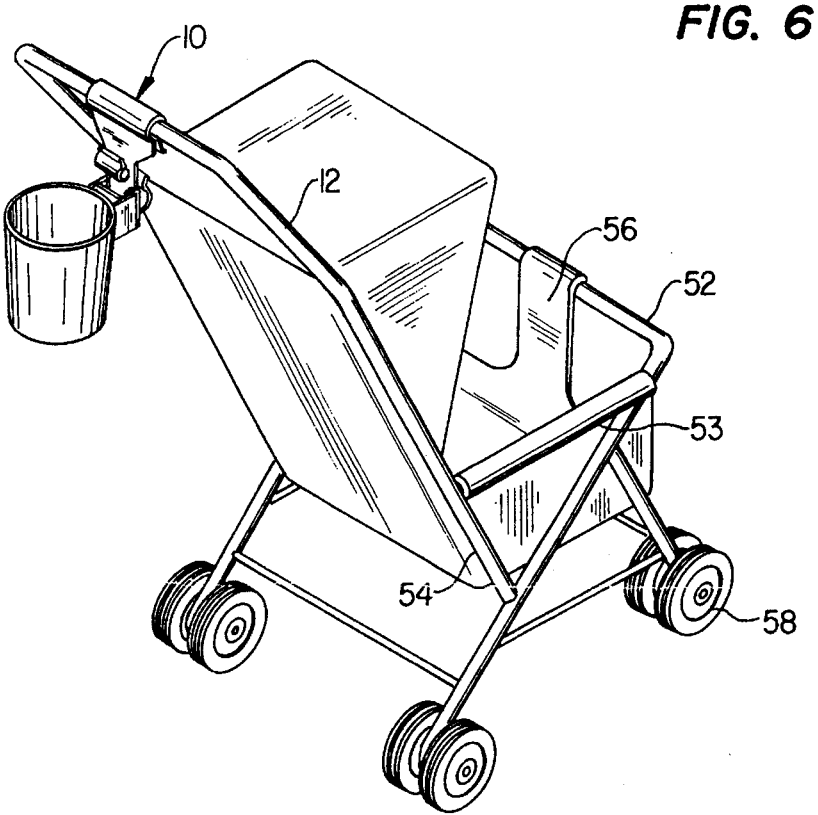
FIG. 1 is a perspective view of an article support assembly system mounted to a generally horizontal bar of a baby stroller.

Referring first to FIG. 1, an article support assembly system 10 such as that previously described may be seen. The article support assembly system 10 is fabricated from plastic or the like in a configuration which facilitates the attachment thereof to a horizontal bar 12 of a conventional stroller or the like. A stroller 52 is shown in a perspective view for illustrating the functional use thereof. The horizontal bar 12 is seen to comprise a portion of the overall stroller frame 54 which supports a stroller seat 56 by a set of wheels 58. A child positioned within the stroller seat 56 may in this way be dealt with while articles such as a purse or beverage container may be supported by the article support assembly system 10.

Figure 2:
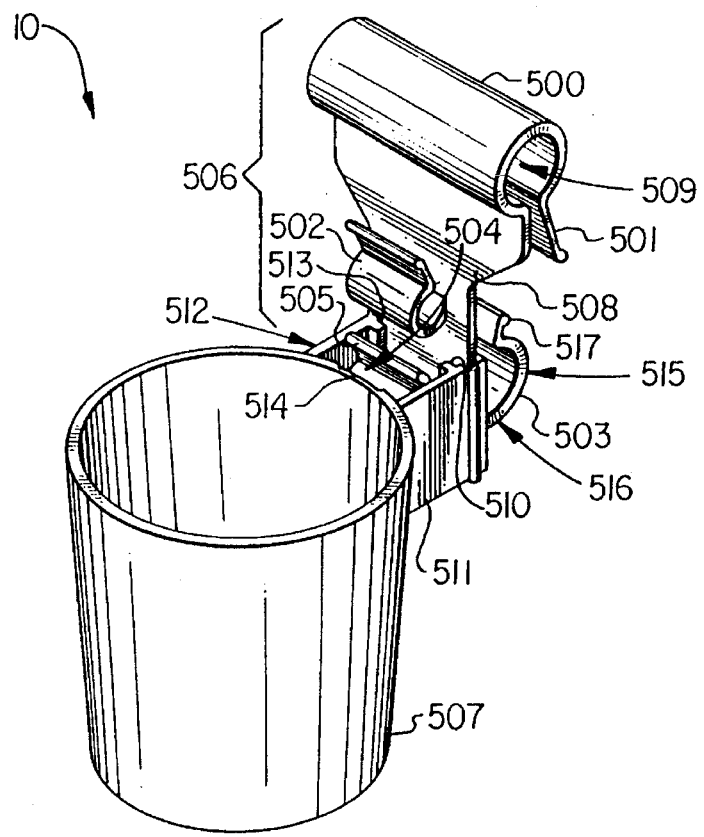
FIG. 2 is an enlarged perspective view of the article support assembly system of FIG. 1.

Referring next to FIG. 2, the article support assembly system 10 may now been seen in greater detail. Tapered cylindrical receptacle 507 is secured to main body portion 506 in attachment region 504. The attachment region 504 consist of two generally parallel vertically orientated planar appendages 511, 512. Integral with the tip of the interior surface of each appendage exist grooves 510 and 513 which lie face to face with a thread guiding means for the main body portion 506. Channel 514 operates as a guide for the locking means using to affix the main body portion 506 and the cylindrical receptacle 507 of the article support assembly system 10.

The main body portion 506 consist of two parts, the upper, tubular body portion 500, constructed with a central hollow region 509 formed therethrough, and a lower planar body surface 508. A lower lip 501 is flared outward from the tubular body portion 500 to facilitate entry of a plurality of handles into the central hollow region 509. The flexing action of the tubular body portion 500 and the lower lip 501 provide the frictional gripping means whereby the main body portion 506 of the article support assembly 10 attaches to a multitude of handles, bars, shafts and the like. Three hooks reside upon the lower planar surface 508 of the main body portion 506, one large hook 503 on the exterior surface and two smaller hooks, 502 and 505 on the interior surface. More specifically, hook 502 lies above hook 505 and both smaller hooks are aligned in an opposing relationship with hook 503. Hooks 502, 503 and 505 each possess a generally similar design. Hook 505 displays the general hook configuration consisting of a superior curved section 515, an inferior curved section 516 as well as an outwardly flared flange 517 angled from the superior curved edge to facilitate receipt of articles therein.

Figure 3:
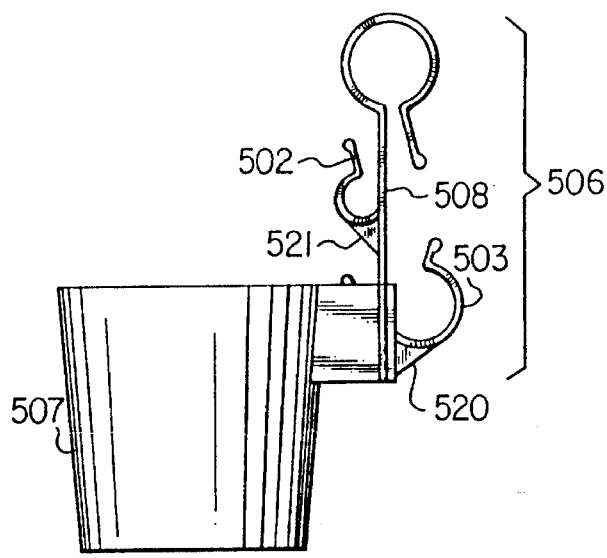
FIG. 3 is a side elevational view of the article support assembly system of FIG. 2.
Figure 4:
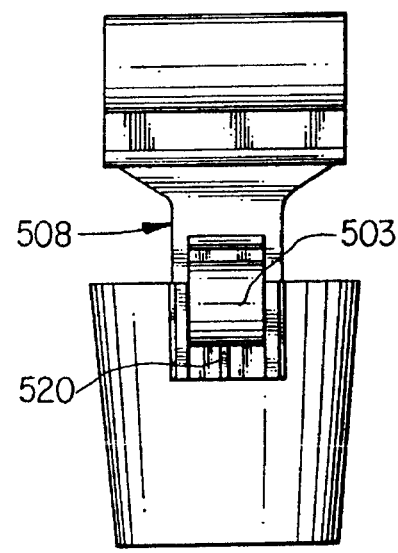
FIG. 4 is a rear elevational view of the article support assembly system of FIG. 2.

Referring next to FIG. 3, a side elevational view of the body portion 506 with the attached tapered cylindrical receptacle 507 may be seen. This view shows the extent of the outward flaring of opposing hooks 502 and 503. Also disclosed are the reinforcing brackets 520, 521 below the large hook 503 and the upper, opposing small hook 502, respectively. FIG. 4 further illustrates the reinforcing bracket 520 of hook 503. Bracket 502 is integrally formed with both the lower planar surface of 508 of the hook assembly 506 and the inferior curved section 516 of the hook 503.

Figure 5:
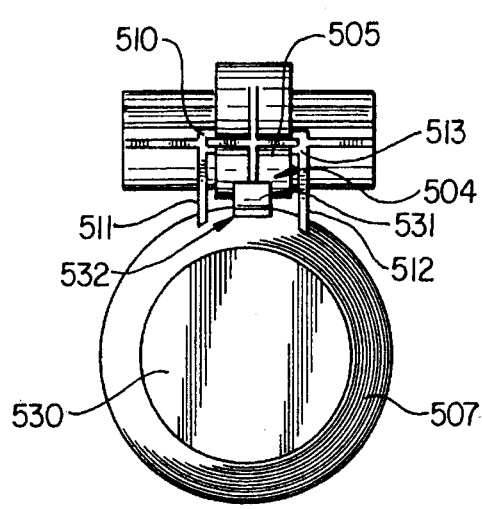
FIG. 5 is a bottom elevational view of the article support assembly system of FIG. 2.

Referring next to FIG. 5, there is shown a rear elevational view of the main body portion 506 and the attached tapered receptacle 507 of the article support assembly system 10. A solid bottom surface 530 underlays the tapered cylindrical receptacle 507, thereby permitting the storage of various loose articles within the receptacle 507. In addition, this view clearly illustrates the attachment region 504. Complimentary grooves 510 and 513 on the tips of the vertical planar appendages 511, 512 create a guiding thread for the edges of the lower surface of the hook assembly. Means for locking the main body portion 506 to the cylindrical receptacle 507 results from the slidably hook-like fasteners 531 and 532. More specifically, fastener 531 is integrally placed upon the apex of the lower hook 505 and the fastener 532 is integrally located upon the outer surface of the cylindrical receptacle 507 between the vertical planar appendages 511 and 512.

Figure 6:
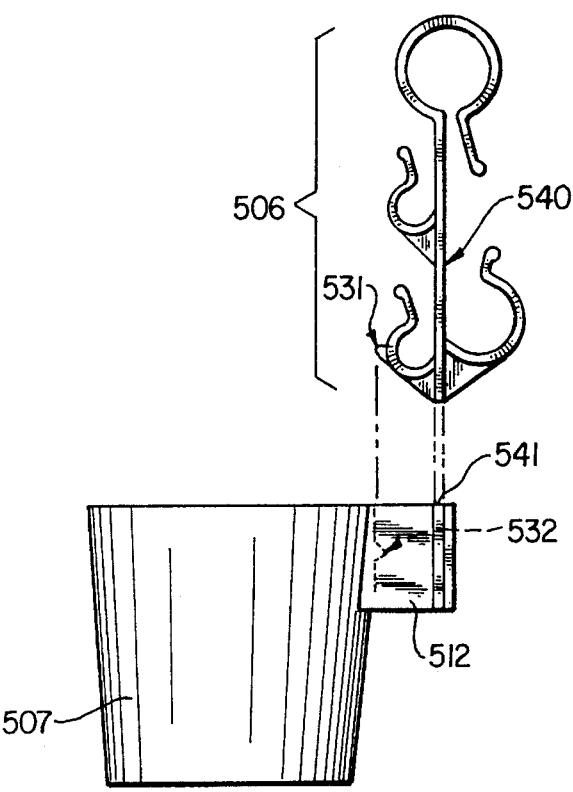
FIG. 6 is an exploded side elevational view of the article support assembly system of FIG. 2.

Referring next to FIG. 6, an exploded view of the main body portion 506 and the cylindrical receptacle 507 of the article support assembly system 10 may now be seen. This view more clearly illustrates the locking system utilized by the invention. In connecting the main body portion 506 and the tapered cylindrical receptacle 507, fastener 531 of the main body portion 506 slides over and subsequently engages the fastener 532 located on the surface of the cylindrical receptacle 507. Ridge 540 of the main body portion 506 impacts with the upper edge 541 of the vertical planar appendage 512 and prevents the main body portion 506 from sliding through the guide thread once the fasteners 531 and 532 connect.

In such a manner, the embodiment of the invention illustrated in FIGS. 1–6 teach an article support assembly system which employs an integrally formed gripping means whereby the assembly unit may be affixed to a multitude of generally horizontal bars, handles, shafts or the like. The support unit possesses hooks that provide a means for suspending various flaccid articles and/or straps. The support unit may be used alone or a receptacle may be attached as a means for supporting a beverage container or for storing various loose articles.

Figure 7:
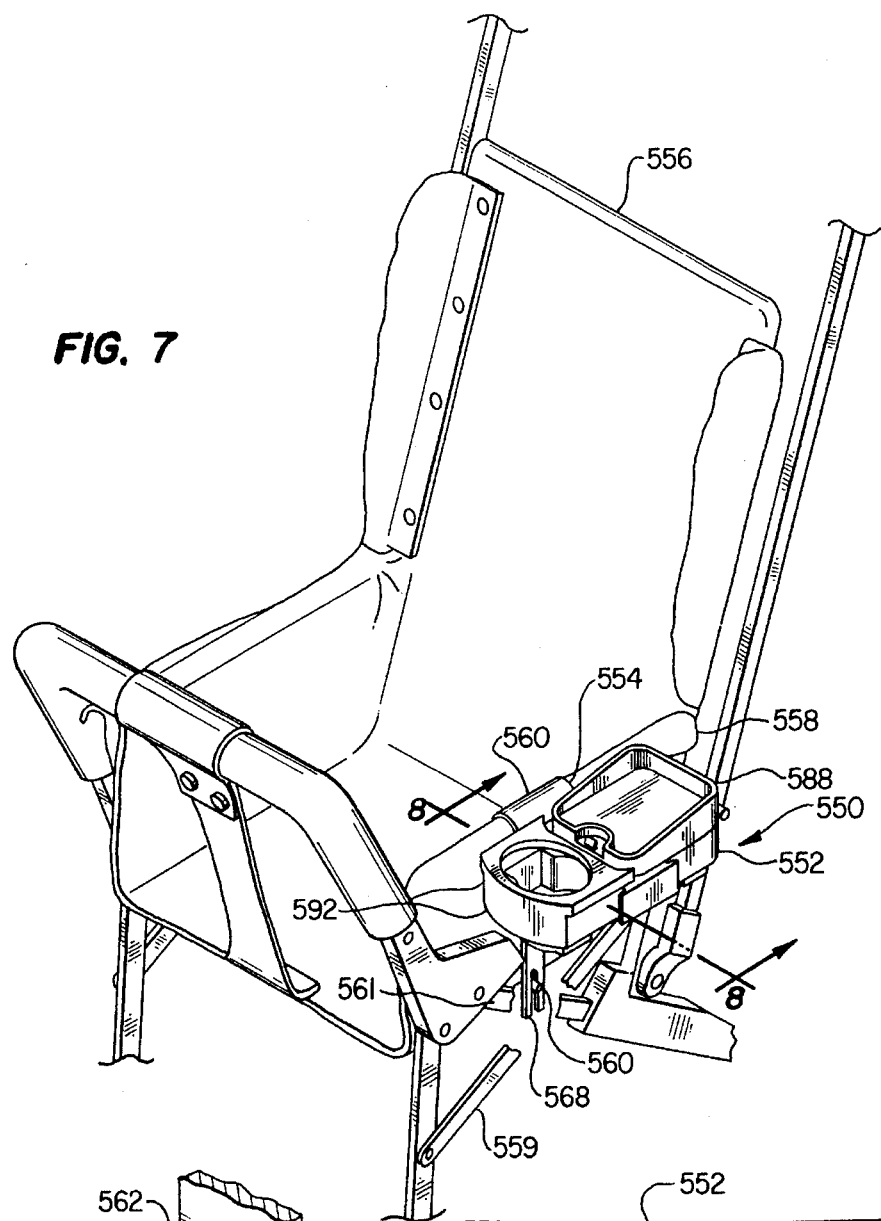
FIG. 7 is a fragmentary perspective view of an article storage system constructed in accordance with the teachings of the present invention and mounted to first and second generally horizontal side bars of a soft-sided stroller.

Referring next to FIG. 7, a mountable article storage system 550 which incorporates a clamping structure 554 which, as may be seen by briefly reviewing FIGS. 1–6, is a modified configuration of the clamping structure of the previously described article support assembly 10 which permits demountable attachment of the article storage system 550 to a generally horizontal side bar 558 of a stroller 556 will now be described in greater detail.

Prior to discussing the mountable article storage system 550, it should be clearly understood that the stroller 556 may be configured as either an open-sided stroller such as the stroller 52 illustrated in FIG. 1 or the soft-sided stroller 556 illustrated in FIG. 7 and that the clamping structure 554 works equally well with either the open-sided stroller 52 of FIG. 1 having a generally horizontal side bar 53 or the sidewall structure of the soft-sided stroller 556.

Figure 8:
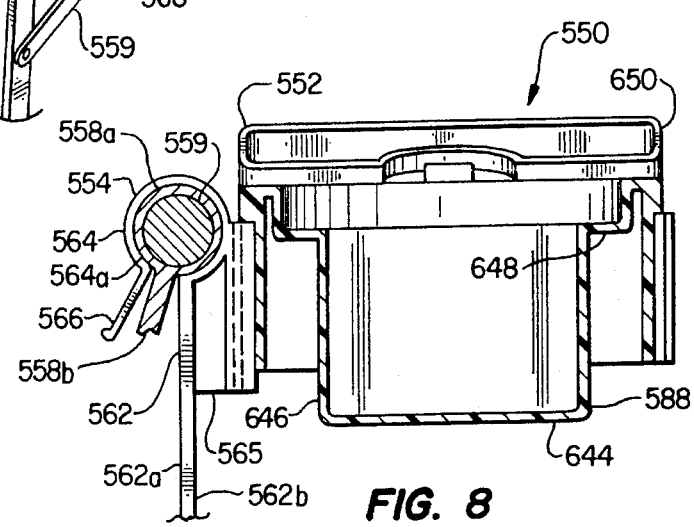
FIG. 8 is a cross-sectional view of the mountable article storage system of FIG. 7 taken along lines 8—8 thereof.

While the configuration of a soft-sided stroller may vary, one such configuration may be seen by reference to FIG. 8. As illustrated in FIG. 8, the sidewall structure includes a generally horizontal bar 559 around which a soft deformable material, for example, cloth, is wrapped therearound. The material forms a generally curved top portion 558a which then extends downwardly to form a sidewall 558b for the stroller 556. So that it is clear that the present invention is suitable for use with either stroller structure, the top portion 558a and sidewall 558b are jointly referred to as side bar 558.

Returning momentarily to FIG. 7, the mountable article storage system 550 includes a tray structure 552 having first and second portions 588, 592 to be more fully described below, attached to a clamping structure 554 which supportably mounts the tray structure 552 to the stroller 556. The clamping structure 554 is particularly well suited for mounting the tray structure 552 to the generally horizontal side bar 558 of the stroller 556 such that the tray structure 552 and any foodstuffs or other objects supported thereby would be accessible to a child seated in the stroller 556. More specifically, the clamping structure 554 includes a main body portion 562 having a tubular upper body portion 564 and a slotted lower body portion 568 integrally formed therewith. The tubular upper body portion 564 extends upwardly from the main body portion 562 for frictional engagement with the generally horizontal side bar 558 while the slotted lower body portion 568 extends downwardly from the main body portion 562 to engage a generally horizontal lower rod 560 of the stroller 556.

Figure 9:
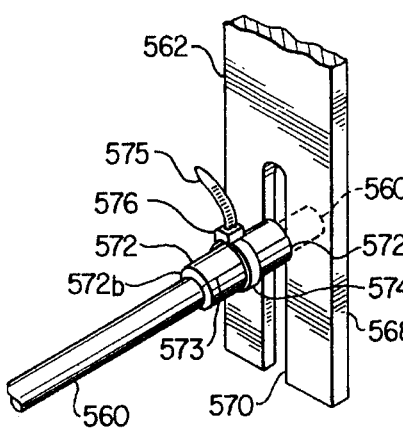
FIG. 9 is an enlarged fragmentary perspective view of the attachment of a lower portion of a clamping structure portion of the mountable article storage system of FIGS. 7–8 to the soft-sided stroller of FIG. 7.

Referring next to FIGS. 8 and 9, the method by which the clamping structure 554 is mounted onto the stroller 556 will now be described in greater detail. Grasping the clamping structure 554 in both hands, the main body portion 562 and a lip portion 566 are pulled a sufficient distance away from each other such that the clamping structure 554 may be placed over the side bar 558 such that the side bar 558 passes through the opening therebetween. The clamping structure 554 is then placed over the side bar 558 such that the lip portion 566 is positioned along the inside portion of the stroller 556 and the main body portion 562 extends downwardly along the outer surface of the stroller 556 such that a first side surface 562a of the main body portion 562 faces the stroller 556 while a second side surface 562b of the main body portion 562 faces away from the stroller 556. The clamping structure 554 is then released, thereby causing an inner side surface 564a of the tubular upper body portion 564 to circumferentially and frictionally grip the side bar 558 over a portion of the curved top portion 558a thereof. It should be noted that while the clamping structure 554 would be ideally suited to grip a generally cylindrical bar, the clamping structure 554 is also suitable for gripping non-cylindrical structures such as the side bar 558 structure illustrated in FIGS. 7–8 which includes a generally curved top portion 558a integrally formed with a downwardly extending sidewall 558b which passes through the opening between the main body portion 562 and the lip portion 566.

After attaching the clamping structure 554 to the side bar 558, the slot 570 formed in the slotted lower body portion 568 of the clamping structure 554 is placed over the generally horizontal rod 560 and slid towards the stroller 556 until the main body portion 562 of the clamping structure 554 contacts the sidewall 558b of the stroller 556. While it is contemplated that, for certain stroller designs, access to the generally horizontal rod 560 from one side thereof will be unobstructed, thereby permitting the main body portion 562 to be slid into position, for the stroller 556 illustrated in FIGS. 7–9, the slot 570 of the slotted lower body portion 568 must be placed over the horizontal rod 560, access to the end 560a of which by the main body portion 562 is obstructed by support frame members 559, 561, both of which have been partially broken away in FIG. 7 for illustrative purposes only. In further accordance with the embodiment of the invention disclosed herein, the aforementioned contact between the clamping structure 554 and the stroller 556 occurs when the first side surface 562a of the main body portion 562 contacts the sidewall 558b of the stroller 556.

As is apparent to those skilled in the art, the weight of the tray structure 552 will attempt to bias the main body portion 562 towards the stroller 556 by pivoting the tubular upper body portion 564 around the generally curved top portion 556a of the side bar 558, thereby destabilizing the entire mountable article storage system 550. Such a situation is of particular concern with those strollers having a relatively thin or flexible sidewall structure 558b or those having a horizontal side bar 53 unconnected to the remainder of the sidewall (if any). To secure the clamping structure 554 such that any movement cause by the tendency of the main body portion 562 to slide towards the stroller 556 under the weight of the tray structure 552, a slitted rubber tube 572 having first and second ends 572a, 572b and a slit 573 therebetween is placed over the rod 560 such that the first end 572a contacts the first side surface 562a of the main body portion 562. Tie means 574 are then used to secure the slitted rubber tube 572 in place. More specifically, a strap portion 575 of the tie means 574 is tightly wrapped around the slitted rubber tub 572 and inserted through an opening in a clamp portion 576 which grasps the strap portion 575 at a desired location along the length thereof. As the slitted rubber tube 572 has a diameter greater than the width of the slot 570, once secured in place, the slitted rubber tube 572 will prevent the main body portion 562 from sliding towards the stroller 556. Finally, it should be noted that, while in the embodiment of the invention illustrated in FIG. 9, the slitted rubber tube 572 is sized to be placed over the rod 560 such that the edge surfaces thereof which define the slit 573 contact each other, it is contemplated that, for many stroller designs, the slitted rubber tube 572 must overlap itself to ensure a snug fit on the rod 560.

Having mounted the clamping structure 554 onto the side of the stroller 556, the attachment of the tray structure 552 onto the clamping structure 554 will now be described in greater detail. Integrally formed with the main body portion 562 and the tubular upper body portion 564 is a back wall 565. Integrally formed with the back wall 565 are a pair of sidewalls 578, each having a guide projection 580 formed therewith. At least one, and preferably two flange members 582 are formed on opposite sides of the tray structure 552, preferably such that each flange member 582 is integrally formed with both the sidewall 646 of the first portion 588 and the outer sidewall 617 of the second portion 592 of the tray structure 552.

To mount the tray structure 552 to the clamping structure 554 to complete assembly of the mountable article storage system 550, the tray structure 552 is held above the clamping structure 554 and then positioned relative to the clamping structure 554 such that the projections 584 are received into respective guides 581, each of which is defined by a corresponding sidewall 578 and guide projection 580. The tray structure 552 is then slid downwardly to mount the tray structure 552 to the clamping structure 554. Specifically, the tray structure 552 is slid downwardly until a lower edge surface 590 of the lid structure 650 and a lower edge surface 586 of the outer sidewall 617 are engaged by an upper side surface of the sidewalls 578 and guide projections 580. Finally, as may be best seen in FIG. 12, a pair of flange members 582 may be formed on the outer side surface of the tray structure 552, thereby permitting the clamping structure 554 to be mounted on one side of the tray structure 552 while a second, alternately configured clamping structure 594 to be more fully described below may be mounted onto the other side of the tray structure 552.

Figure 12:
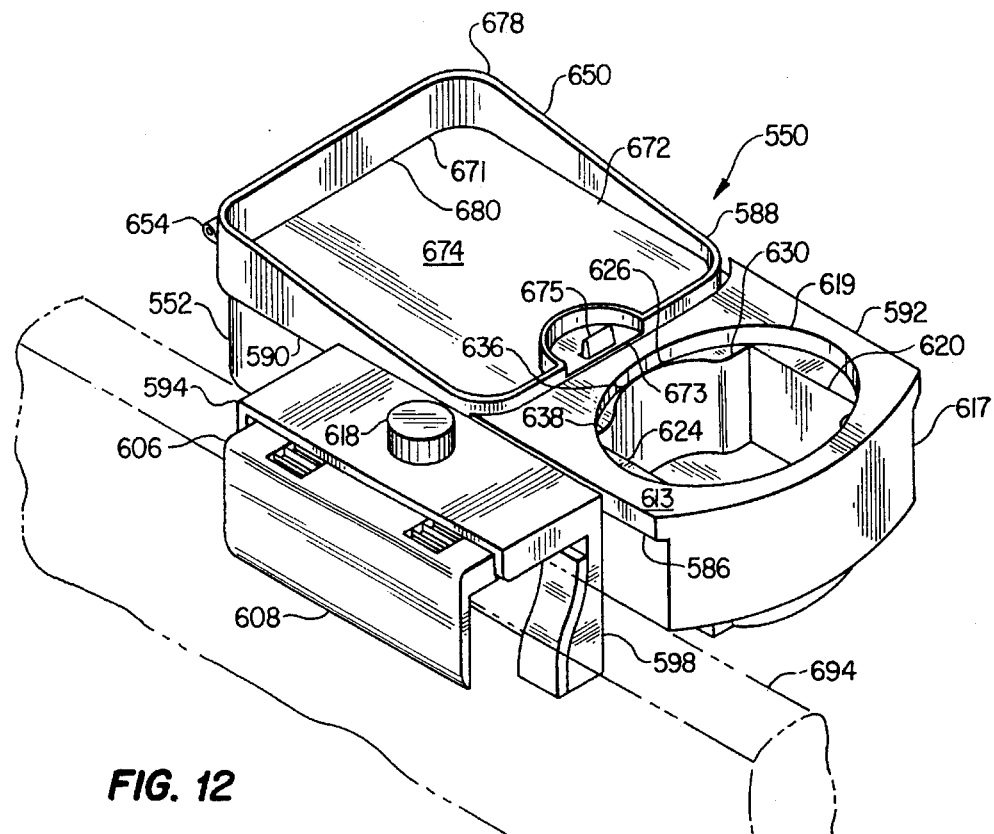
FIG. 12 is a perspective view illustrating the attachment of the mountable article storage system of FIGS. 7–11 to a hard-sided stroller, car door or other support structure using the second configuration of the clamping structure portion of FIGS. 10–11.
Figure 13:
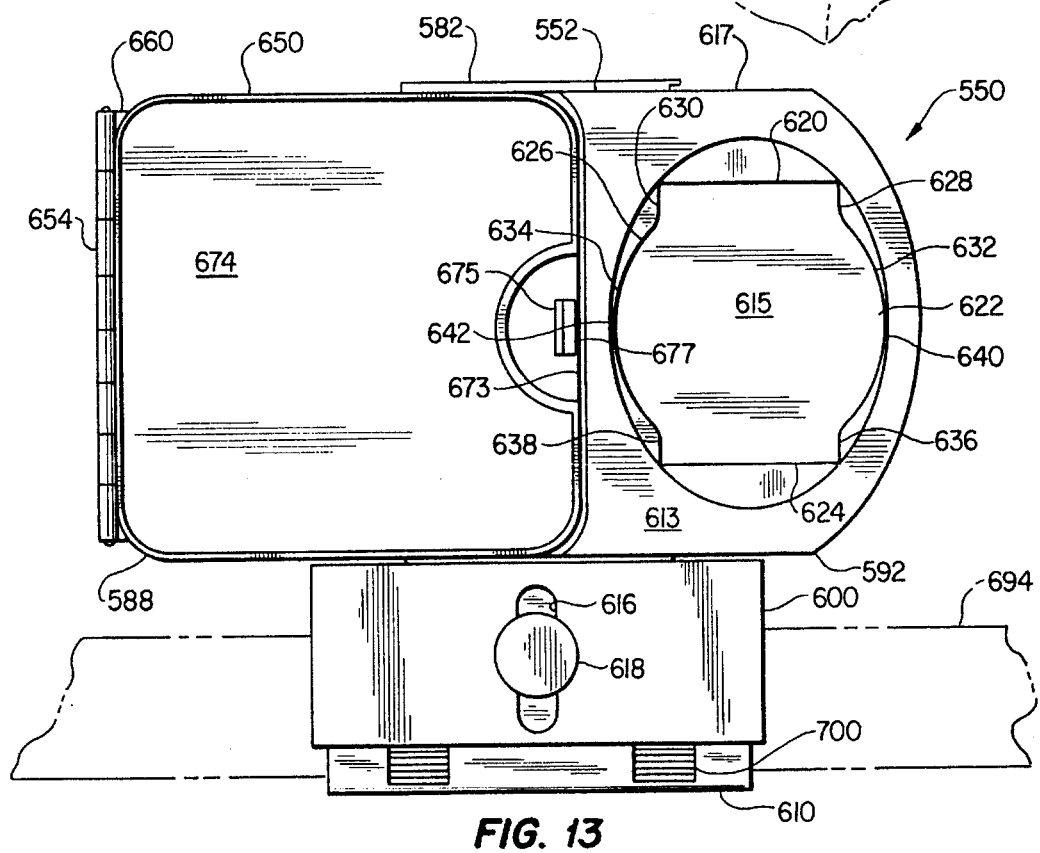
FIG. 13 is a top plan view of the mountable article storage system of FIG. 12.

Referring now to FIGS. 10 and 12–13, the second portion 592 of the tray structure 552 will now be described in greater detail. As may now be seen, the second portion 592 has a top wall 613, a base wall 615, an outer sidewall 617 and a generally oval-shaped upper interior sidewall 619 integrally formed with the top wall 613. Integrally formed with the base wall 615 and the upper interior sidewall 619 are first, second, third and fourth lower interior sidewalls portions 620, 622, 624 and 626 which together define a receptacle for supportably receiving articles therein.

As may be best seen in FIG. 12, the first lower interior sidewall portion 620 is integrally formed with and generally orthogonal to the lower interior sidewall portions 622 and 626 at opposite ends thereof while the lower interior sidewall portion 624 is integrally formed with and generally orthogonal to the lower interior sidewall portions 622 and 626 at opposite ends thereof. The first and third lower interior sidewall portions 620, 624 are planar surfaces, each having a generally rectangular surface, which face each other in a generally parallel relationship. The second and fourth lower interior sidewall portions 622, 626 each have a respective first, planar, sidewall part 628, 630 which face each other in a generally parallel relationship, a second, curved, sidewall part 632, 634 and a third, planar, sidewall part 636, 638 which also face each other in a generally parallel relationship and are spaced apart a distance approximately equal to the distance separating the sidewall parts 628, 630. The second curved sidewall part 632 is convexly curved relative to the adjacent, generally co-planar, sidewall parts 628 and 636 while the second curved sidewall part 634 is concavely curved relative to the adjacent, generally co-planar, sidewall parts 626 and 638. While the distances separating the lower interior sidewall portions 620, 622, 624, 626, and the various sidewall parts 628, 630, 632, 634, 636, and 638 thereof, may be varied without departing from the scope of the present invention, it is preferred that the first and third lower interior sidewall portions 620, 624 be separated by a distance of about 2⅞ inches, the first sidewall parts 628, 630 and the third sidewall parts 636, 638 be separated by a distance of about 1⅞ inches and center points 640, 642 of the second, concavely curved sidewall parts 632, 634 be separated by a distance of about 2¾ inches.

It is noted that the unique shape and dimensioning of the receptacle defined by the lower interior sidewall portions 620, 622, 624 and 626, the receptacle is able to supportably accommodate either a cylindrically-shaped or a box-shaped beverage container therein. Specifically, a cylindrically-shaped beverage container would be held upright by the concavely curved sidewall parts 632 and 634 if placed in the receptacle defined by the lower interior sidewall portions 620, 622, 624 and 626 while a box-shaped beverage container would be held upright by the lower interior sidewalls 620 and 624 and the sidewall parts 628, 630, 636 and 638 if placed in the receptacle defined by the lower interior sidewall portions 620, 622, 624 and 626.

Referring now to FIGS. 8, 10 and 12–13, the first portion 588 of the tray structure 550 will now be described in greater detail. The first portion 588 includes a generally rectangularly shaped base wall 644 and a sidewall 646 integrally formed therewith. The sidewall 646 extends upwardly, at a generally orthogonal angle relative to the base wall 644, along an outer periphery of the base wall 644, until terminating at a top wall 648, thereby defining a generally box-shaped receptacle for receiving at least one article therein. As before, it is specifically contemplated that the dimensions of the base wall 644 and the sidewall 646 may be varied without departing from the scope of the present invention. It is preferred, however, that the base wall 644 and the sidewall 646 be sized to form a receptacle which extends about 4¼ inches along each side and has a depth of about 1¾ inches, thereby enabling the receptacle to supportably accommodate with ease, standard size sandwiches made from a conventionally sized loaf of bread as well as sandwich buns used by most fast food, as well as other, restaurants.

A lid structure 650 is rotatably attached to the top wall 648 along a first side 652 thereof by a hinge structure 654. The hinge structure 654 includes a horizontal extension 656 of the first side 652 of the top wall 648 and a series of open ended tubes 657 integrally formed with the horizontal extension 656 at spaced locations therealong. Likewise, the lid structure 650 includes a series of similarly shaped tubes 658 integrally formed along an edge 660 of the lid structure at locations interdigitally spaced relative to the tubes 654. The lid structure 650 is then aligned with the first side 652 of the top wall 648 such that the tubes 654 are interdigitally spaced with the tubes 658. A pin 670 is then inserted to through the tubes 654, 658 to rotatably secure the lid structure 650 to the first portion 588 of the tray structure 552.

The lid structure 650 is comprised of a generally rectangular main body portion 672 dimensioned to engage, along a peripheral edge thereof, the entirety of the top wall 648 when rotated into a closed position such as that illustrated in FIGS. 12 and 13. The main body portion 672 includes a top side surface 674, a bottom side surface 676 and a wall structure 678 formed along the peripheral edge thereof and extending both upwardly and downwardly from the main body portion 672 at respective generally orthogonal angles thereto. More specifically, the wall structure 678 includes an upper wall structure 680 which forms a wall which defines an enclosed area along the top side surface 674 of the main body portion 672 and a lower wall structure 682 which forms a wall defining an enclosed area along the bottom side surface 676 of the main body portion 672. As may be best seen in FIG. 12, the upper wall structure 680 extends along the peripheral edge 671 of the top side surface 674 except for a portion 673 thereof where the upper wall structure 680 extends inwardly to exclude latch 675 from the enclosed area defined thereby.

As previously set forth, the lid structure 650 is rotatable between an open position (see FIG. 10) in which the aforementioned receptacle is accessible and the lower side surface 676 is positioned in the same general plane as the top wall 648 by the engagement of one or more projections (not visible) formed along an outer side surface of the sidewall 646 and positioned immediately below the hinge structure 654 with an outer side surface of the upper wall structure 580 and a closed position (see FIG. 12) in which the receptacle is inaccessible. Furthermore, as the lid structure 650 is rotated from the open position to the closed position, a latch 675 integrally formed with the top wall 648 projects through an aperture 677 formed in the main body portion 672 of the lid structure 650 and engages the top side surface 674 in a snap-lock. To unlock and rotate the lid structure 650 from the closed position back into the open position, the latch 675 is first pulled out of its engagement with the top side surface 674 and the lid structure 650 rotated.

As also previously set forth, the base wall 644 and the sidewall 646 defines a receptacle for receiving a conventionally sized sandwich or other foodstuffs. It should be noted, however, that the uniquely configured first portion 588 of the tray structure 552 provides numerous other platforms on which foodstuffs or other articles may be supported. In the closed position, a sandwich or other foodstuff may be stored in the receptacle defined by the base wall 644 and the sidewall 646. At the same time, however, a second foodstuff may be placed on the upper side surface 674 of the lid structure. Furthermore, as the upper sidewall 678 defines an enclosed area along the upper side surface 674, the foodstuff placed on the upper side surface 674 may be a loose foodstuff such as small "gold-fish" type crackers which tend to move easily and which would easily fall off of a flat surface such as the upper side surface 674 if not held within the enclosed area by the upper sidewall 678.

Further flexibility in the support of foodstuffs or other articles is available when the lid structure 650 is rotated into the open position. The lower side surface 676 of the lid structure 650 now functions as a flat surface capable of supporting a sandwich or other large, relatively immovable, foodstuff. The receptacle defined by the base wall 644 and the sidewall 646 may now be used to hold a second, loose, foodstuff, for example, french fries or potato chips, which are restrained from falling out of the receptacle by the sidewall 646. Thus, together with the receptacle capable of supporting either a cylindrical or box-shaped beverage container which is incorporated as part of the second portion 592 of the tray structure 552, the tray structure 552 provides a high degree of flexibility in its ability support a wide range of foods and beverages. Furthermore, unlike the article support assembly disclosed in the parent of the present application, the unique configuration of the clamping structure 554 permits the tray structure 552 to be mountable along the side of a stroller 556, thereby enabling an infant or toddler to be able to consume the beverages or foodstuffs supported thereby.

Referring next to FIGS. 10, 11, 12 and 13, a second, alternate, clamping structure 594 will now be described in greater detail. As previously discussed, the clamping structure 554 works particularly well with either open-sided or soft-sided strollers. However, it is acknowledged that the clamping structure 554 is not particularly well suited for mounting the tray structure 552 onto a hard-sided stroller. Typically, a hard-sided stroller is characterized by a thick, relatively inflexible sidewall, often having a generally rectangular cross section. Furthermore, the clamping structure 554 is also not particularly well suited for mounting the tray structure 552 onto other structures, most notably, cars, to which it would be desirable to mount the tray structure 552 thereto. Accordingly, a second, alternate clamping structure 594 suitable for mounting the tray structure 552 to hard-sided strollers, cars and other support structures characterized by relatively thick sidewalls having generally rectangular or otherwise non-circular cross-sections is also disclosed herein.

The clamping structure 594 is comprised of first and second generally L-shaped members 596, 606, each comprised of side and top parts 598 and 600, 608 and 610, respectively, integrally formed together. A generally circular projection 612 having an aperture 614 formed in the general center thereof projects outwardly from the top part 610 of the second generally L-shaped member 606. The first generally L-shaped member 596 includes a slot 616 formed in the top part 600 thereof and a knob 618 having a diameter greater than the width of the slot 616 and positioned over the slot 616. A bolt 690 or another conventional attachment or screw means are used to mount the first and second generally L-shaped members 596, 606 together. Preferably, the bolt 690 is permanently affixed to the top part 610 such that a threaded shaft portion thereof projects through the aperture 614 of the projection 612. The knob 618, which has a threaded aperture 692 formed in the general center thereof, is then screwed onto the threaded shaft of the bolt 690.

To mount the clamping structure 594 onto a hard sided stroller, car door, or other relatively thick support structure 694, most commonly, one having a generally rectangular cross-section, the knob 618 is turned counterclockwise to loosen the engagement between the first and second generally L-shaped members 596, 606. The clamp structure 594 is then positioned over the structural member 694 such that the side parts 598, 608 are on opposite sides thereof. It should be noted, however, that if the structural member 694 is that portion of a car door located between the passenger compartment and a window, the side part 608 is slid between the window and a rubber strip separating the window and the structural member 694. The first and second generally L-shaped members 596, 606 are then squeezed together to secure a tight clamp fit over the structural member 694. The clamp fit of the first and second generally L-shaped members 596, 606 is then tightened by turning the knob 618 clockwise, thereby securing the first and second generally L-shaped members 596, 606 together. Once the clamping structure 594 is mounted to the support structure 694, the tray structure 552 is attached to the clamping structure 554. As the clamping structure 594 includes a pair of sidewalls 602 and guide projections 604 mounted to a back side surface thereof which are identically configured to the sidewalls 578 and guide projections 580 previously described, the tray structure 552 is attached to the clamping structure 594 in a manner similar to that previously described with respect to the attachment of the tray structure 552 to the clamping structure 554 and need not be described in greater detail herein.

If desired, a bottom side surface of the top part 600 and a top side surface of the top part 610 may be provided with complementary series of generally parallel projections 698 and indentations 700, respectively. When the top part 600 of the first generally L-shaped member 596 is placed over the top part 610 of the second generally L-shaped member 606, the projections 698 are received in the indentations 700, thereby engaging the first and second generally L-shaped members 596, 606. When the first and second generally L-shaped members 596, 606 are squeezed together, the projections 698 are pushed out of one indentation 700 and into a next indentation 700 to again engage the first and second generally L-shaped members 596, 606.

Thus, there has been described and illustrated herein, a article support system which includes a uniquely configured tray structure configured to support various articles, most particularly, a wide range of foods, including a single large foodstuff, a multiplicity of smaller foodstuffs, a cylindrically-shaped beverage container and a box-shaped beverage container. Furthermore, the article support assembly is configured for attachment to various clamping structures which permit the mounting of the tray structure to various support structures, including soft-sided strollers, hard-sided strollers and car doors. However, those skilled in the art will recognize that numerous modifications and variations from that specifically disclosed herein are possible without substantially departing from the scope of the present invention. It should be clearly understood, therefore, that the embodiment of the invention disclosed herein is considered to be exemplary only and should not be construed as limiting the invention, which is defined only by the claims appended hereto.

What is claimed is:

1. A mountable article storage system, comprising:

a tray structure for supporting at least one article thereon; and a clamping structure, attached to said tray structure, for mounting said tray structure to a support frame;

said tray structure comprised of a first portion having a first sidewall which defines a first opening and a first receptacle for supportably receiving an article therein and a second portion having a second sidewall which defines a second receptacle for supportably receiving a second article therein, a hinge structure attached to said second sidewall of said tray structure and projecting outwardly therefrom and a generally planar lid structure having upper and lower side surfaces, said lid structure rotatably affixed to said hinge structure such that said lid structure is movable between a closed position in which access to said second receptacle is blocked by said lid structure and an open position in which said second receptacle is accessible and said lower side surface of said lid structure is movable to generally the same plane as the first opening of the first receptacle to provide a generally flat surface for placing loose articles thereon.

2. A mountable article storage system according to claim 1 wherein said lid structure further comprises:

a first sidewall extending upwardly from said upper side surface, said first sidewall of said lid structure defining a first enclosed area for receiving loose articles therein when said lid structure is in said closed position.

3. A mountable article storage system according to claim 2 wherein said second sidewall of said second portion further comprises a flexible projection integrally formed therewith and upwardly projecting therefrom and said lid structure having an aperture formed therein, said projection being receivably inserted in said aperture when said lid structure is rotated from said open position to said closed position, thereby locking said lid structure in said closed position.

4. A mountable article storage system according to claim 3 wherein said first sidewall of said lid structure which defines said first enclosed area further comprises first and second parts integrally formed with each other, said first part of extending along a portion of a peripheral edge of said upper side surface and said second part extending inwardly from said peripheral edge such that said aperture is outside of said first enclosed area.

5. A mountable article storage system according to claim 2 wherein said lid structure further comprises a second sidewall extending downwardly from said lower side surface, said second sidewall of said lid structure defining a second enclosed area for receiving loose articles therein when said lid structure is in said open position.

6. A mountable article storage system according to claim 5 wherein said clamping structure further comprises an upper side surface and wherein said second sidewall of said lid structure further comprises a lower edge surface which provides a stop when attaching said clamping structure to said tray structure by engaging said upper side surface of said clamping structure.

7. A mountable article storage system according to claim 1 wherein said first sidewall defining said first receptacle includes a curved part dimensioned to supportably engage a portion of an exterior surface of a cylindrically shaped beverage container and a non-curved part integrally formed with said curved part and dimensioned to supportably engage a portion of an exterior surface of a box-shaped beverage container.

8. A mountable article storage system according to claim 7 wherein said clamping structure further comprises an upper side surface and wherein said first sidewall defining said first receptacle further comprises an outwardly projection portion having a lower edge surface which provides a stop when attaching said clamping structure to said tray structure by engaging said upper side surface of said clamping structure.

9. A mountable article storage system according to claim 1 wherein said first sidewall which defines said first receptacle further comprises:

a first, generally planar, sidewall portion;

a second, generally planar, sidewall portion, said second sidewall portion being integrally formed with and generally orthogonal to said first sidewall portion;

a third, generally curved, sidewall portion integrally formed with said second sidewall portion;

a fourth, generally planar, sidewall portion integrally formed with said third sidewall portion and generally co-planar with said second sidewall portion;

a fifth, generally planar, sidewall portion integrally formed with and generally orthogonal to said fourth sidewall portion, said first and fifth sidewall portions being generally parallel with each other;

a sixth, generally planar, sidewall portion integrally formed with and generally orthogonal to said fifth sidewall portion, said fourth and sixth sidewall portions being generally parallel with each other;

a seventh, generally curved, sidewall portion integrally formed with said sixth sidewall portion, said third and seventh sidewall portions being oppositely orientated relative to each other; and an eighth, generally planar, sidewall portion integrally formed with said first and seventh sidewall portions, said eighth sidewall portion being generally co-planar with said sixth sidewall portion, generally orthogonal with said first sidewall portion and generally parallel with said second sidewall portion.

10. A mountable article storage system according to claim 1 wherein said tray structure further comprises a first exterior side surface and a flange member formed along said first exterior side surface of said tray structure, said flange member being removably engageable with said clamping structure.

11. A mountable article storage system according to claim 10 wherein said clamping structure further comprises an exterior side surface and first and second guide projections attached to said exterior side surface of said clamping structure and outwardly extending therefrom to define first and second slots, and said flange member further comprises first and second projections for inserting into said first and second slots, respectively, to mate said tray structure with said clamping structure.

12. A mountable article storage system according to claim 10 wherein said tray structure further comprises a second exterior side surface and a second flange member formed along said second exterior side surface of said tray structure, said flange member being removably engageable with said clamping structure.

13. A mountable article storage system according to claim 1 wherein said support frame includes first and second generally horizontal bars and wherein said clamping structure further comprises:

a body portion;

a first end portion extending downwardly from said body portion, said first end portion engaging said first generally horizontal bar; and a second end portion extending upwardly from said body portion, said second end portion having a first end integrally formed with said body portion, a generally tubular intermediate section for circumferentially and frictionally gripping said second generally horizontal bar and a second end.

14. A mountable article storage system according to claim 13 wherein said second end portion further comprises means for inserting said second generally horizontal bar into said generally tubular intermediate section for circumferential gripping therewith.

15. A mountable article storage system according to claim 14 wherein said means for inserting said second generally horizontal bar into said generally tubular intermediate section further comprises a lip integrally formed with said generally tubular intermediate section at said second end.

16. A mountable article storage system according to claim 13 wherein a slotted aperture is formed in said first end portion, said first generally horizontal bar being inserted into said slotted aperture to engage said clamping structure and said first generally horizontal bar.

17. A mountable article storage system according to claim 16 wherein said first end portion further comprises a bottom edge surface, said slotted aperture extending upwardly from said bottom edge surface in a direction generally parallel with said downward extension of said first end portion.

18. A mountable article storage system according to claim 17 and further comprising a flexible tube having first and second ends and a slit which extends from said first end to said second end, said slitted flexible tube having a diameter wider than said slotted aperture and being mounted on said first generally horizontal bar to limit movement of said clamping structure relative to said first generally horizontal bar.

19. A mountable article storage system according to claim 18 wherein said first end portion further comprises a first side surface which faces said support frame and a second side surface which faces away from said support frame and wherein said slitted tube is mounted onto said first generally horizontal bar along said first side surface of said first end portion.

20. A mountable article storage system according to claim 19 and further comprising tie means for securing said slitted tube to said first generally horizontal bar such that said second end of said slitted tube engages said first side surface of said first end portion.

21. A mountable article storage system according to claim 20 wherein said second end portion further comprises means for inserting said second generally horizontal bar into said generally tubular intermediate section for circumferential gripping therewith.

22. A mountable article storage system according to claim 21 wherein said means for inserting said second generally horizontal bar into said generally tubular intermediate section further comprises a lip integrally formed with said generally tubular intermediate section at said second end.

23. A mountable article storage system according to claim 1 wherein said clamping structure further comprises:

a first, generally L-shaped body portion having a top part having a slot formed therein and a side part generally orthogonal to and integrally formed with said top part;

a second, generally L-shaped body portion having a top part and a side part generally orthogonal to and integrally formed with said top part; and means for adjustably securing said top part of said first generally L-shaped body portion to said top part of said second generally L-shaped body portion such that the distance between said side part of said first and second generally L-shaped body portions when said top parts are secured together may be varied;

wherein said support frame is receivably engaged between said first and second side parts to supportably mount said article storage system to said support frame.

24. A mountable article storage system according to claim 23 wherein said means for adjustably securing said top part of said first generally L-shaped body portion and said top part of said second generally L-shaped body portion further comprises:

a projection extending upwardly from said top part of said second generally L-shaped body portion and through said slot formed in said top part of said first generally L-shaped body portion, a portion of said projection projecting outwardly from said slot; and knob means for engaging said portion of said projection projecting outwardly from said slot.

25. A mountable article storage system according to claim 24 wherein said projection further comprises:

a generally circular projection integrally formed with said second top part and having an aperture formed in the general center thereof, said generally circular projection having a diameter slightly less than the width of said slot; and screw means extending through said aperture in said projection and projecting from said top side of said first generally L-shaped body portion;

said knob means having an threaded aperture formed in the general center thereof for threadably receiving said screw means.

26. A mountable article storage system according to claim 23 wherein a lower side surface of said top part of said first generally L-shaped body portion further comprises a generally parallel series of projections and wherein an upper side surface of said top part of said second generally L-shaped body portion further comprises a corresponding generally parallel series of indentations, said projections of said top part of said first generally L-shaped body, portion being received by said corresponding indentations of said top part of said second generally L-shaped body portion to provide frictional engagement between said first and second generally L-shaped body portions.

27. A mountable article storage system, comprising:

a tray structure for supporting at least one article thereon, said tray structure having a first sidewall which defines an opening and a receptacle for supportably receiving an article therein, a hinge structure attached to said first sidewall of said tray structure and projecting outwardly therefrom and a generally planar lid structure having upper and lower side surfaces, said lid structure rotatably affixed to said hinge structure such that said lid structure is movable between a closed position in which access to said receptacle is blocked by said lid structure and an open position in which said receptacle is accessible and said lower side surface of said lid structure is movable to generally the same plane as the opening to provide a generally flat surface for placing loose articles thereon; and a clamping structure, attached to said tray structure, for mounting said tray structure to a support frame.

28. A mountable article storage system according to claim 27 wherein said lid structure further comprises:

a first sidewall extending upwardly from said upper side surface, said first sidewall of said lid structure defining a first enclosed area for receiving loose articles therein when said lid structure is in said closed position.

29. A mountable article storage system according to claim 28 wherein said first sidewall of said tray structure further comprises a flexible projection integrally formed therewith and upwardly projecting therefrom and said lid structure having an aperture formed therein, said projection being receivably inserted in said aperture when said lid structure is rotated from said open position to said closed position, thereby locking said lid structure in said closed position.

30. A mountable storage system according to claim 29 wherein said first sidewall of said lid structure which defines said first enclosed area further comprises first and second parts integrally formed with each other, said first part of extending along a portion of a peripheral edge of said upper side surface and said second part extending inwardly from said peripheral edge such that said aperture is outside of said first enclosed area.

31. A mountable article storage system according to claim 28 wherein said lid structure further comprises a second sidewall extending downwardly from said lower side surface, said second sidewall of said lid structure defining a second enclosed area for receiving loose articles therein when said lid structure is in said open position.

32. A mountable article storage system according to claim 31 wherein said clamping structure further comprises an upper side surface and wherein said second sidewall of said lid structure further comprises a lower edge surface which provides a stop when attaching said clamping structure to said tray structure by engaging said upper side surface of said clamping structure.

33. A mountable article storage system according to claim 27 wherein said tray structure further comprises an exterior side surface and a flange member formed along said exterior side surface of said tray structure, said flange member being removably engageable with said clamping structure.

34. A mountable article storage system according to claim 33 and further comprising a second flange member formed along a second exterior side surface of said tray structure, said flange member being removably engageable with said clamping structure.

35. A mountable article storage system according to claim 27 wherein said clamping structure further comprises first and second guide projections attached to a back wall of said clamping structure and outwardly extending therefrom to define first and second slots, and said flange member further comprises first and second projections for inserting into said first and second slots, respectively, to mate said tray structure with said clamping structure.

36. A mountable article storage system according to claim 27 wherein said support frame includes first and second generally horizontal bars and wherein said clamping structure further comprises:
- a body portion;
- a first end portion extending downwardly from said body portion, said first end portion engaging said first generally horizontal bar; and
- a second end portion extending upwardly from said body portion, said second end portion having a first end integrally formed with said body portion, a generally tubular intermediate section for circumferentially and frictionally gripping said second generally horizontal bar and a second end.

37. A mountable article storage system according to claim 36 wherein said second end portion further comprises means for inserting said second generally horizontal bar into said generally tubular intermediate section for circumferential gripping therewith.

38. A mountable article storage system according to claim 37 wherein said means for inserting said second generally horizontal bar into said generally tubular intermediate section further comprises a lip integrally formed with said generally tubular intermediate section at said second end.

39. A mountable article storage system according to claim 36 wherein a slotted aperture is formed in said first end portion, said first generally horizontal bar being inserted into said slotted aperture to engage said clamping structure and said first generally horizontal bar.

40. A mountable article storage system according to claim 39 wherein said first end portion further comprises a bottom edge surface, said slotted aperture extending upwardly from said bottom edge surface in a direction generally parallel with said downward extension of said first end portion.

41. A mountable article storage system according to claim 40 and further comprising a flexible tube having first and second ends and a slit which extends from said first end to said second end, said slitted flexible tube having a diameter wider than said slotted aperture and being mounted on said first generally horizontal bar to limit movement of said clamping structure relative to said first generally horizontal bar.

42. A mountable article storage system according to claim 41 wherein said first end portion further comprises a first side surface which faces said support frame and a second side surface which faces away from said support frame and wherein said slitted tube is mounted onto said first generally horizontal bar along said first side surface of said first end portion.

43. A mountable article storage system according to claim 36 and further comprising tie means for securing said slitted tube to said first generally horizontal bar such that said second end of said slitted tube engages said first side surface of said first end portion.

44. A mountable article storage system according to claim 43 wherein said second end portion further comprises means for inserting said second generally horizontal bar into said generally tubular intermediate section for circumferential gripping therewith.

45. A mountable article storage system according to claim 44 wherein said means for inserting said second generally horizontal bar into said generally tubular intermediate section further comprises a lip integrally formed with said generally tubular intermediate section at said second end.

46. A mountable article storage system according to claim 27 wherein said clamping structure further comprises:
- a first, generally L-shaped body portion having a top part having a slot formed therein and a side part generally orthogonal to and integrally formed with said top part;
- a second, generally L-shaped body portion having a top part and a side part generally orthogonal to and integrally formed with said top part; and
- means for adjustably securing said top part of said first generally L-shaped body portion to said top part of said second generally L-shaped body portion such that the distance between said side part of said first and second generally L-shaped body portions when said top parts are secured together may be varied;
- wherein said support frame is receivably engaged between said first and second side parts to supportably mount said article storage system to said support frame.

47. A mountable article storage system according to claim 46 wherein said means for adjustably securing said top part of said first generally L-shaped body portion and said top part of said second generally L-shaped body portion further comprises:
- a projection extending upwardly from said top part of said second generally L-shaped body portion and through said slot formed in said top part of said first generally L-shaped body portion, a portion of said projection projecting outwardly from said slot; and
- knob means for engaging said portion of said projection projecting outwardly from said slot.

48. A mountable article storage system according to claim 47 wherein said projection further comprises:
- a generally circular projection integrally formed with said second top part and having an aperture formed in the general center thereof, said generally circular projection having a diameter slightly less than the width of said slot; and
- screw means extending through said aperture in said projection and projecting from said top side of said first generally L-shaped body portion;
- said knob means having an threaded aperture formed in the general center thereof for threadably receiving said screw means.

49. A mountable article storage system according to claim 46 wherein a lower side surface of said top part of said first generally L-shaped body portion further comprises a generally parallel series of projections and wherein an upper side surface of said top part of said second generally L-shaped body portion further comprises a corresponding generally parallel series of indentations, said projections of said top part of said first generally L-shaped body portion being received by said corresponding indentations of said top part of said second generally L-shaped body portion to provide frictional engagement between said first and second generally L-shaped body portions.

50. A mountable article storage system, comprising:
- a tray structure for supporting at least one article thereon; and
- a clamping structure, attached to said tray structure, for mounting said tray structure to a support frame;
- said tray structure comprised of a first portion having a first sidewall which defines a first, open-topped, receptacle for supportably receiving an article therein and a second portion having a second sidewall which defines a second receptacle for supportably receiving a second article therein and a lid structure rotatably affixed to said second sidewall, said lid structure movable between a closed position in which access to said second receptacle is blocked by said lid structure and an open position in which said second receptacle is accessible;

said lid structure comprised of a generally planar main body portion having upper and lower side surfaces and a first sidewall extending upwardly from said upper side surface, said first sidewall of said lid structure defining a first enclosed area for receiving loose articles therein when said lid structure is in said closed position;

said second sidewall of said second portion further comprised of a flexible projection integrally formed therewith and upwardly projecting therefrom and said lid structure having an aperture formed therein, said projection being receivably inserted in said aperture when said lid structure is rotated from said open position to said closed position, thereby locking said lid structure in said closed position;

wherein said first sidewall of said lid structure which defines said first enclosed area further comprises first and second parts integrally formed with each other, said first part of extending along a portion of a peripheral edge of said upper side surface and said second part extending inwardly from said peripheral edge such that said aperture is outside of said first enclosed area.

51. A mountable article storage system, comprising:

a tray structure for supporting at least one article thereon, said tray structure having a first sidewall which defines a receptacle for supportably receiving an article therein and a lid structure rotatably affixed to said sidewall, said lid structure movable between a closed position in which access to said receptacle is blocked by said lid structure and an open position in which said receptacle is accessible; and a clamping structure, attached to said tray structure, for mounting said tray structure to a support frame;

said lid structure further comprising a generally planar main body portion having upper and lower side surfaces and a first sidewall extending upwardly from said upper side surface, said first sidewall of said lid structure defining a first enclosed area for receiving loose articles therein when said lid structure is in said closed position;

said first sidewall of said tray structure further comprising a flexible projection integrally formed therewith and upwardly projecting therefrom and said lid structure having an aperture formed therein, said projection being receivably inserted in said aperture when said lid structure is rotated from said open position to said closed position, thereby locking said lid structure in said closed position;

wherein said first sidewall of said lid structure which defines said first enclosed area further comprises first and second parts integrally formed with each other, said first part of extending along a portion of a peripheral edge of said upper side surface and said second part extending inwardly from said peripheral edge such that said aperture is outside of said first enclosed area.

52. A mountable article storage system, comprising:

a tray structure for supporting at least one article thereon; and a clamping structure, attached to said tray structure, for mounting said tray structure to a support frame;

said tray structure comprised of a first portion having a first sidewall which defines a first, open-topped, receptacle for supportably receiving an article therein and a second portion having a second sidewall which defines a second receptacle for supportably receiving a second article therein, a hinge structure attached to said second sidewall of said tray structure and projecting outwardly therefrom and a generally planar lid structure having upper and lower side surfaces, said lid structure rotatably affixed to said hinge structure such that said lid structure is movable between a closed position in which access to said second receptacle is blocked by said lid structure and an open position in which said second receptacle is accessible, said lower side surface of said lid structure provides a generally flat surface for placing loose articles thereon and said lower side surface of said lid structure and a top side surface of said second sidewall of said tray structure are positioned in a single plane.

53. A mountable article storage system, comprising:

a tray structure for supporting at least one article thereon; and a clamping structure, attached to said tray structure, for mounting said tray structure to a support frame;

said tray structure comprised of a first portion having a first sidewall which defines a first opening and a first receptacle for supportably receiving an article therein and a second portion having a second sidewall which defines a second receptacle for supportably receiving a second article therein, a hinge structure attached to said second sidewall of said tray structure and projecting outwardly therefrom and a generally planar lid structure having a peripheral edge and upper and lower side surfaces, said lid structure rotatably affixed to said hinge structure such that said lid structure is movable between a closed position in which said peripheral edge of said lid structure engages a top side surface of said second sidewall of said tray structure and access to said second receptacle is blocked by said lid structure and an open position in which said second receptacle is accessible and said lower side surface of said lid structure is movable to generally the same plane as the first opening of the first receptacle to provide a generally flat surface for placing loose articles thereon.

* * * * *